3,001,744
AUTOMATIC CONTROL DEVICE FOR BRAKING THE WHEEL OF AN AIRCRAFT

René Lucien, Neuilly-sur-Seine, France, assignor to Société à responsabilite limitée: Recherches Etudes Production R.E.P., Paris, France, a corporation of France
Filed Dec. 18, 1956, Ser. No. 629,173
Claims priority, application France Feb. 21, 1956
4 Claims. (Cl. 244—111)

This invention relates to braking control systems.

Braking control systems are known—which have the object of automatically preventing skidding of the wheels of aircraft running along the ground, when the braking effort applied to the wheel is powerful enough to cause the wheels to skid. One such system is that described in my co-pending application No. 524,227, filed July 25, 1955, now Patent No. 2,960,290. Such braking control systems also provide means for making the braking control inoperative when the air craft is stationary or is running slowly along the ground, and also means which act when an aircraft rebounds, to prevent it from coming again into contact with the ground with the wheels braked.

Figure 1:
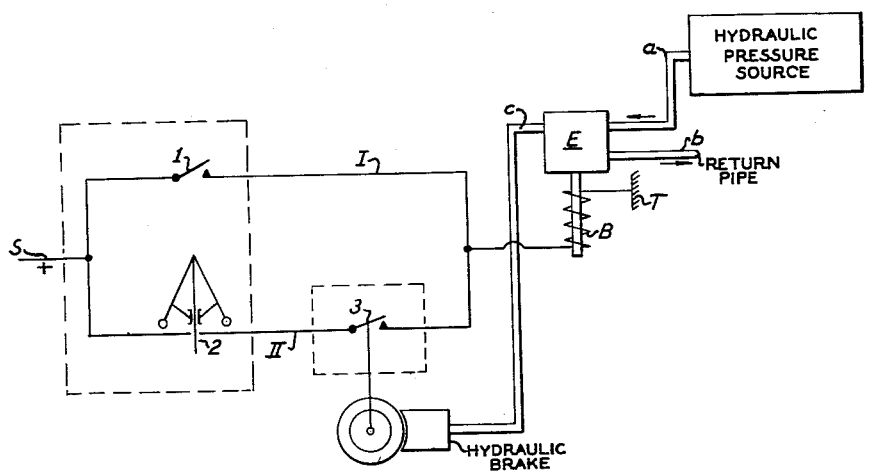
Figure 2:
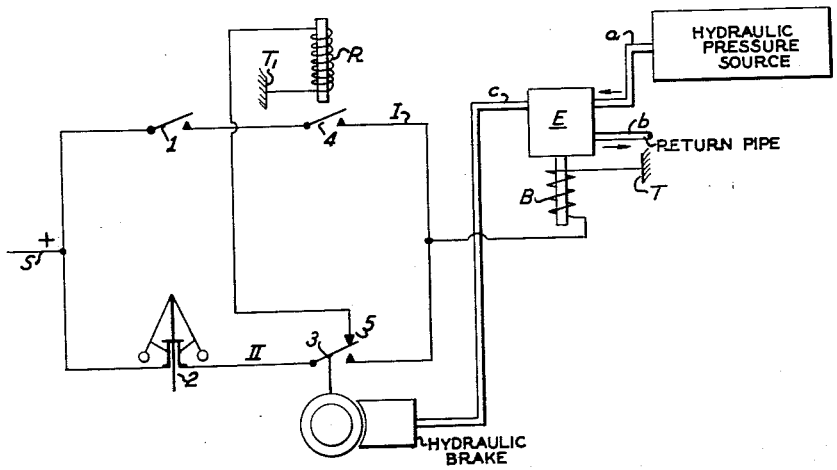

A braking control device of the prior art which fulfils these conditions is shown diagrammatically as in FIG. 1 of the accompanying drawings, while FIG. 2 shows a similar diagram according to the present invention. In FIG. 1 E is an electromagnetic spill valve for controlling the braking which, depending on whether it is excited or not, puts an inlet conduit $a$ for fluid under pressure in communication with an exhaust conduit $b$, or puts the inlet conduit into communication with a braking conduit $c$ which terminates at the brake.

The coil B of the electro-valve E is included in an electric circuit comprising a source of current S, a line I, the coil B and ground T. In the line I is connected an acceleration responsive anti-skid device, for example of the type disclosed in applicant's U.S. Patent 2,747,699, shown diagrammatically by the switch 1. This device is open as long as the deceleration due to the braking action has not reached a critical value beyond which skidding is to be feared, and is closed when this value is reached, the closure being effected by the relative displacement of an element of the device with respect to a shaft co-axial with the device and driven by the wheel.

In parallel with this first circuit is connected a second circuit II which comprises in series a wheel speed responsive contactor 2 and a suspension load responsive contactor 3. The speed responsive and load responsive contactors may be actuated, for example, as disclosed in applicant's U.S. Patent 2,744,699. At low speeds of rotation of the wheel, the contact 2 is closed, and it is opened when the wheel rotates at high speed, for example when the aircraft has just landed.

The contactor 3 is mounted for example on the telescopic shock-absorber of the leg of the landing gear. When the aircraft is on the ground and the shock-absorber is, in consequence, loaded by the weight of the aircraft, the contactor 3 is open. On the other hand, it is closed when the aircraft is in the air.

It will be noted from an examination of FIG. 1 that the contacts 1 and 3 are open when the aircraft is running along the ground at low speed or with a small deceleration; the coil B of the electro-valve E cannot be excited. It is thus possibly to apply the brakes as with an ordinary braking system.

When the aircraft is running along the ground at high speed, the contactor 2 is also open; no current can then pass in the line II, and braking can be carried out, but under the control of the switch 1 in the line I.

In the case of a rebound, the shock-absorber becomes extended and the contact 3 is closed; the wheel having left the ground during the rebound can no longer be in a period of critical deceleration and in consequence the switch 1 may be open, which permits braking to be effected if the pilot has kept his foot on the brake pedal during the rebound, but then the wheel, having left contact with the ground, is prevented from rotating, and the contactor 2 closes; the current then passes through the line II, the electro-valve is excited and the braking ceases, even if the pilot keeps his foot on the pedal. The aircraft cannot thus again make contact with the ground with the wheel braked.

Although this arrangement would appear to comply in this way with all the conditions of safety referred to, it is found however that it has the following drawback:

When the aircraft running along the ground is required to change direction sharply, for example when following a track having curves, so as to reach its departure or arrival point, it is convenient to carry out this change in direction by braking the wheel nearest to the center of turning. The result is that during turning, the centrifugal force applied to the center of gravity of the aircraft acts to reduce the load on the braked wheel while, on the other hand, the load on the unbraked wheel is increased. The braked wheel loses for this reason some of its adhesion to the ground and decelerates more than if the aircraft were running in a straight line with both wheels braked.

This deceleration is then able to cause the braking control to operate and, in consequence, to apply to this wheel alternate braking and releasing actions which are a nuisance to the pilot and make the steering of the aircraft inaccurate. The present invention provides a remedy for this drawback.

The invention consists in inserting in the electric circuit of the electro-valve of the braking control, a supplementary contactor which is actuated by a relay controlled by the speed responsive contactor and interrupts the current to the electro-valve only when the speed responsive contactor is closed, and whatever may be the state of the acceleration responsive switch.

The diagram given in FIG. 2 shows an example of embodiment of the device according to the invention.

When the aircraft is running along the ground, the lead responsive contactor 3 is open. The speed responsive contactor 2 is closed since the aircraft is travelling slowly. The acceleration responsive switch 1 may be open or closed. This situation corresponds to that shown in FIG. 2.

In accordance with the invention, there is included a mechanism comprising, for example, in the line I, between the contactor 1 and the coil B of the electro-magnetic spill valve a switch 4 which is operated by a relay R, the coil of which has one end connected to the terminal 5 of the contactor 3 in line II, the other end of the coil being connected to ground at $T_1$; this relay is so arranged that it cuts-off the contactor 4 when it is excited.

It will be seen that in the conditions shown in FIG. 2, the coil of the relay R is excited and the contactor 4 is opened; in consequence, no current passes in the coil B of the electro-valve, and the brake acts like an ordinary brake. On the other hand, when the aircraft is running at high speed, the contactor 2 is open; the relay R being no longer excited, the line I is re-established in its initial condition, so that the automatic braking control operates in the usual manner.

What I claim is:

1. In combination with a wheel braking system, a control member coupled to the system and operative to deactivate the system and prevent application of the brakes, an electrical control circuit coupled to said control member to actuate the control member with the circuit closed and to render it inoperative with the circuit open, a first device including a control switch in the circuit operative automatically to close the control circuit and prevent a locked wheel condition, a speed responsive device including a shunt circuit by-passing the switch to close the control circuit over a predetermined speed range of the wheel and render the control member operative with said first device inoperative, a suspension device responsive to wheel loading including a further switch in the shunt circuit to open the control circuit and render the control member inoperative with the wheel at rest, and means coupled to and actuatable by the suspension device with said suspension device inoperative and operative to render the control member inoperative with the first and speed responsive devices operative.

2. In a wheel braking system including control means actuatable to render said system inoperative and further including first means coupled to said control means and responsive to deceleration of the wheel for actuating said control means, and second and third means coupled to said control means and responsive respectively to wheel speed and wheel position for cooperatively actuating said control means; means operatively associated with said first and third means and operated by the latter to render said first means ineffective.

3. In a fluid brake control system, an electromagnetic spill valve actuatable to render the brake ineffective, a control circuit operatively associated with the spill valve, an acceleration responsive switch in the circuit for closing the same and actuating the valve, a further switch operatively associated with the acceleration responsive switch to inhibit actuation of the valve, and a shunt circuit by-passing the acceleration responsive and further switches and including a load responsive switch and speed responsive switch in series and a relay actuatable by an opening of said load responsive switch to operate the said further switch to inhibit actuation of the valve.

4. In combination with a wheel braking system, a first device operatively associated with the system to prevent wheel braking and thereby preventing the possibility of a locked wheel condition, a speed responsive device operatively associated with the system to prevent effective wheel braking in response to actuation of said first device over a predetermined speed range of the wheel, a suspension device responsive to wheel loading operatively associated with the system to prevent wheel braking and means coupled to the system and to the suspension device and actuatable by the latter with the suspension device ineffective to prevent wheel braking, thereby to render the system effective to brake the wheel with the first and speed responsive devices effective to prevent wheel braking.

References Cited in the file of this patent
UNITED STATES PATENTS

| | | |
|---|---|---|
| 2,744,699 | Lucien | May 8, 1956 |
| 2,788,186 | Wilson | Apr. 9, 1957 |